March 24, 1959
H. T. SMITH ET AL
2,878,857
TIRE BUILDING APPARATUS
Filed Aug. 31, 1955
5 Sheets-Sheet 1
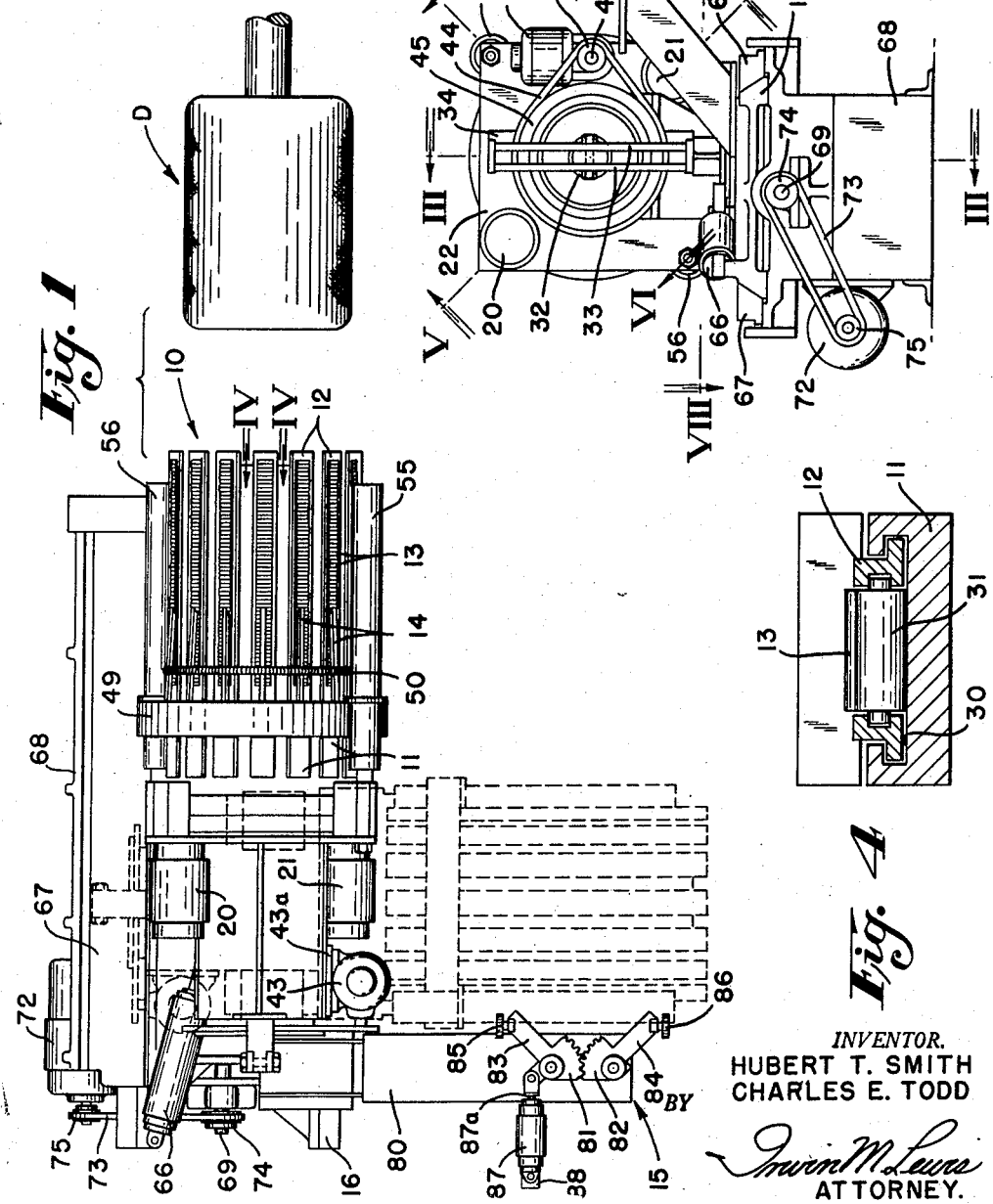
INVENTOR.
HUBERT T. SMITH
CHARLES E. TODD
BY Irvin M. Lewis
ATTORNEY.

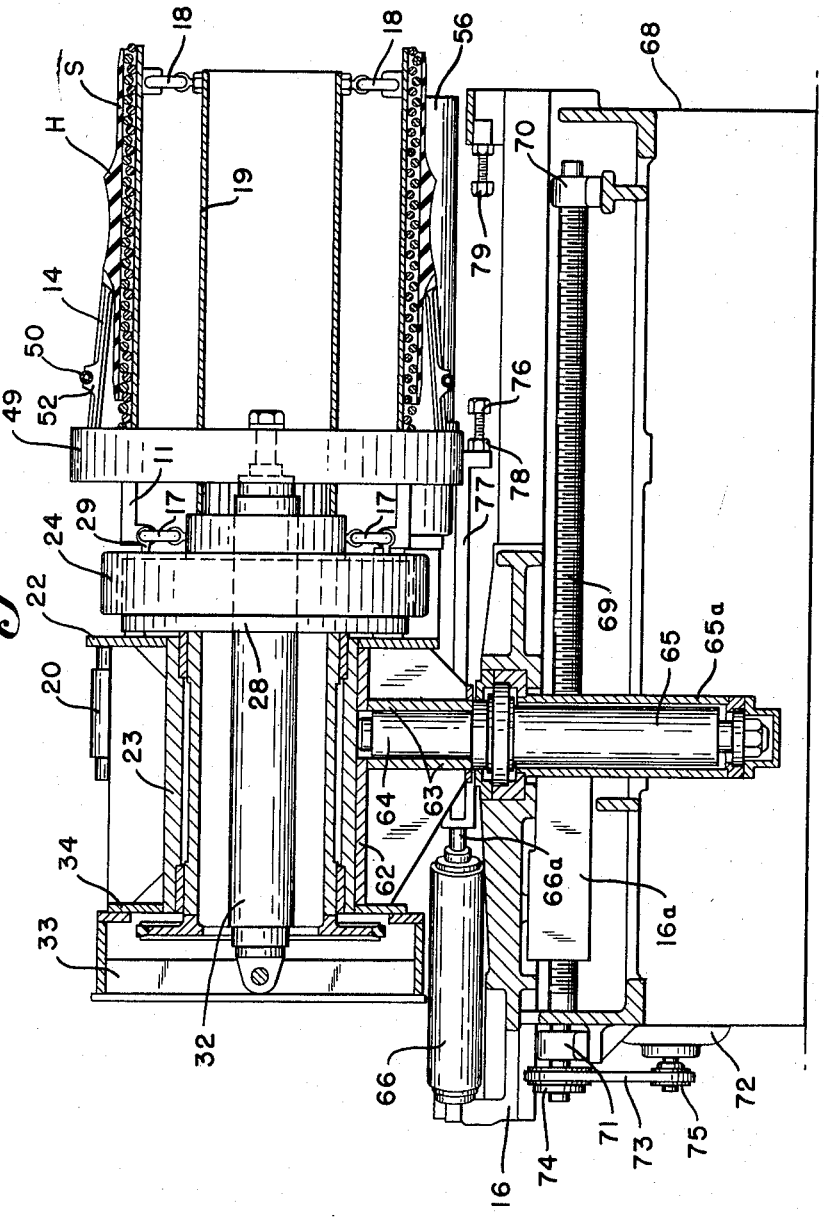

March 24, 1959 H. T. SMITH ET AL 2,878,857
TIRE BUILDING APPARATUS
Filed Aug. 31, 1955 5 Sheets-Sheet 3

INVENTOR.
HUBERT T. SMITH
BY CHARLES E. TODD

*Irwin M. Lewis*
ATTORNEY.

INVENTOR.
HUBERT T. SMITH
CHARLES E. TODD
BY
ATTORNEY.

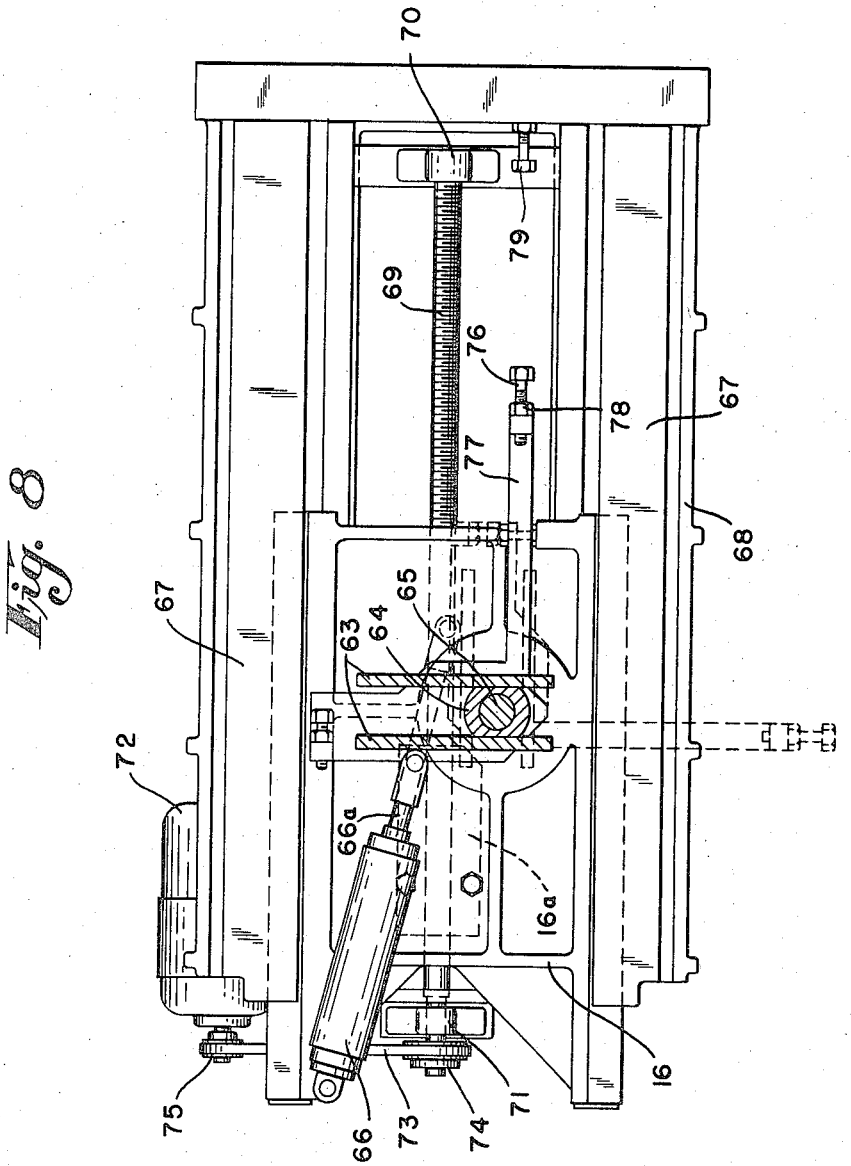

United States Patent Office 2,878,857
Patented Mar. 24, 1959

2,878,857

TIRE BUILDING APPARATUS

Hubert T. Smith, St. Clair Shores, and Charles E. Todd, Detroit, Mich., assignors to United States Rubber Company, New York, N.Y., a corporation of New Jersey Application August 31, 1955, Serial No. 531,698

10 Claims. (Cl. 154—9)

This invention relates to apparatus for building pneumatic tires and in particular to apparatus for applying either carcass fabric or tread stock in the form of endless bands to a tire building drum in the fabrication of a tire.

Carcass fabric and tread stock are commonly applied to a tire building drum in the fabrication of a tire by either winding strips thereof directly on the tire building drum and splicing the ends of the strips together while on the drum or by first forming the strips into endless bands by splicing the ends thereof together and then stretching and slipping the endless band so formed over the tire building drum.

The latter method, is considered desirable because a more uniform splice between the ends of the stock may be made when the stock is off the drum than when on the drum and because more uniform stretching of the stock can be obtained in applying the stock in band form to the drum than in strip form, thereby insuring more uniform distribution of the stock weight.

However, because the application of tread stock and carcass fabric in band form by methods and apparatus heretofore proposed is considerably more time consuming than the application thereof in strip form directly to the drum, the method has not been widely used except in manufacturing large, heavy tires, where it is difficult to stretch and splice the stock while on the tire building drum.

The object of the present invention is to provide apparatus which will quickly and efficiently apply either tread stock or carcass fabric in endless band form to a tire building drum.

In accordance with the invention, the apparatus includes a collapsible drum which when expanded is extendible axially over and around a tire building drum to position stock in band form carried thereby around the tire building drum and a stripping mechanism for stripping the stock off the collapsible drum onto the tire building drum as the collapsible drum is retracted axially from around the tire building drum.

In a preferred form of the apparatus, the collapsible drum is pivotally mounted for movement from a discharge position in alignment with a tire building drum to a loading position where the stock in band form may be placed and centered on the collapsible drum.

Other objects and advantages of the present invention will become apparent from the following description when read in conjunction with the accompanying drawings wherein;

Fig. 1 is a plan view of the apparatus of the invention, showing its location relative to a tire building drum to which a stock in band form is to be applied;

Fig. 2 is the left hand end view of the apparatus shown in Fig. 1;

Fig. 3 is a sectional view taken on the line III—III of Fig. 2;

Fig. 4 is a sectional view taken on the line IV—IV of Fig. 1;

Fig. 8 is a sectional view taken on the line VIII—VIII of Fig. 2.

Figure 5:
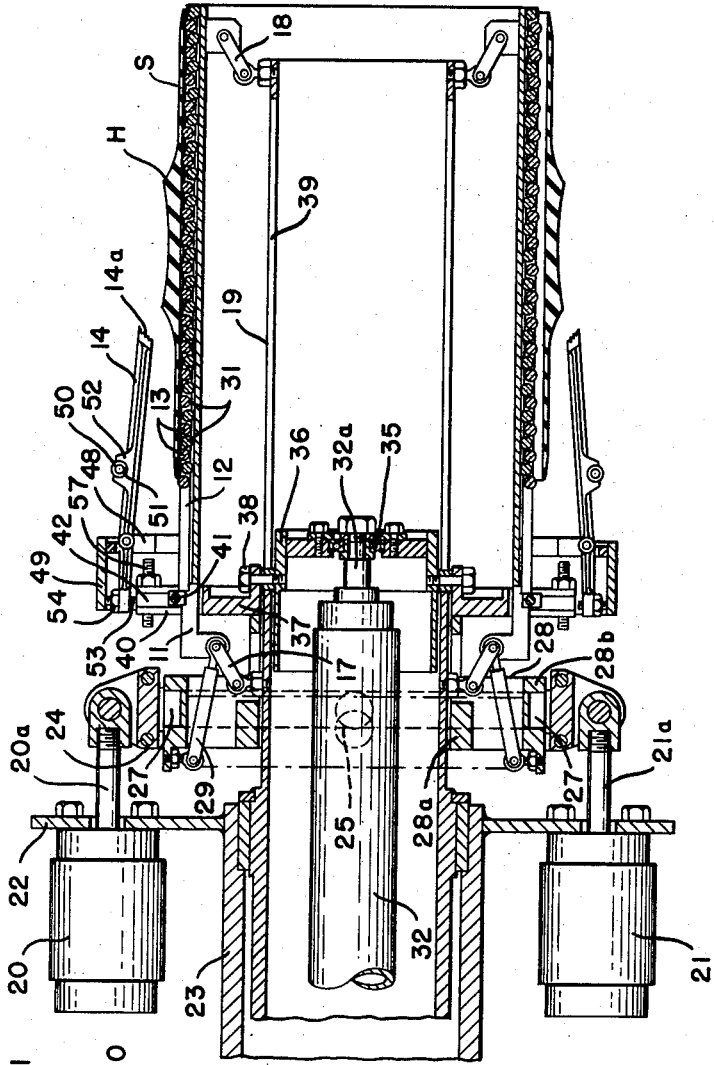
Fig. 5 is a sectional view taken on the line V—V of Fig. 2 showing stock in band form positioned on the collapsible drum preparatory to applying the band of stock to the tire building drum.

Referring to the drawings and in particular to Figs. 1 and 2, the collapsible drum of the invention for expanding and applying an endless band of stock to a tire building drum D, is generally designated by the reference numeral 10.

The collapsible drum 10 is formed of a plurality of segments 11 which are movable radially inwardly and outwardly to expand and collapse the drum 10. Each segment 11 includes an outer extension member 12 which may be extended axially to collectively form with the extension member 12 of the other segments 11 and extension of the drum 10 which may be extended over and around the tire building drum D.

The stock in band form is carried on the extension members 12 and each extension member 12 carries a plurality of freely rotatable rollers 13 which extend beyond the outer surface thereof to facilitate axial movement of the stock thereon.

Figure 6:
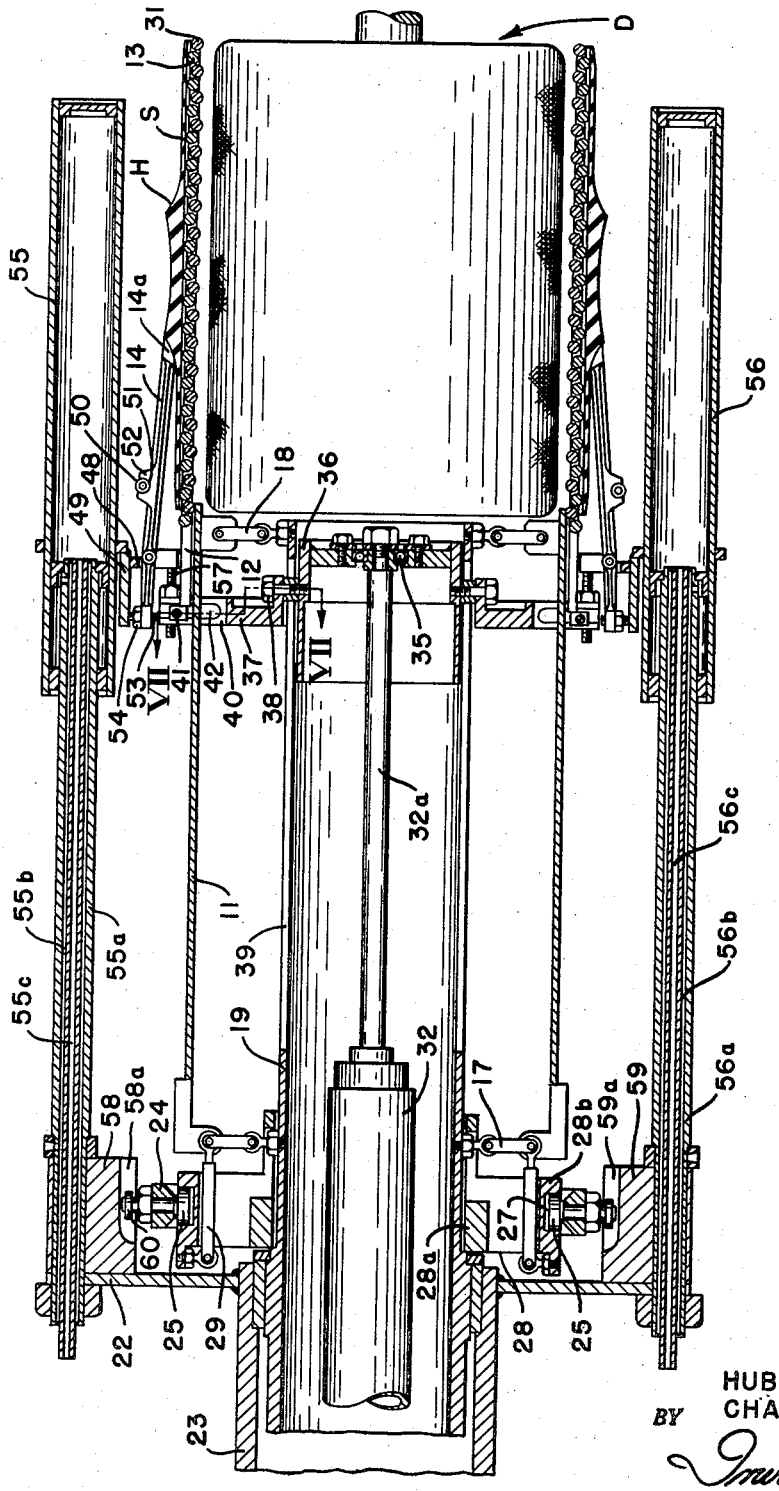
Fig. 6 is a partial sectional view taken on the line VI—VI of Fig. 2 showing the collapsible drum extended axially over and around the tire building drum in the process of applying the stock in band form to the tire building drum.

In the application of the stock carried thereby, the extension members 12 are extended axially over and around the tire building drum D to thereby position the stock S around the tire building drum as shown in Fig. 6. The extension members 12 are then retracted and simultaneously therewith the stock is engaged by stripping fingers 14 which prevent the stock from retracting with the extension members 12 so that the stock is slipped axially off the extension members 12 onto the tire building drum D.

The band of stock S is fabricated to have a diameter slightly less than that of the tire building drum D or at least less than the diameter of any previously applied plies of stock and is applied to the collapsible drum 10 while the drum 10 is collapsed and is stretched by expansion of the drum 10 to a size to fit over the tire building drum D. When the stretched band of stock S is stripped off the extension members 12, it contracts, due to its inherent elasticity, tightly around the tire building drum D or previously applied stock carried by the tire building drum D. In most cases, it has been found that the stock, and in particular rubber tread stock, such as illustrated in the drawings, will contract so tightly around the tire building drum D that subsequent stitching down of the stock is not necessary.

The collapsible drum 10 is rotatably mounted for rotation about its axis and also for horizontal pivotal movement from a loading position, as shown in dashed lines in Fig. 1, to a discharge position in axial alignment with the end of the tire building drum D, as shown in full lines in Fig. 1. A centering device, generally designated by the reference numeral 15, engageable with the stock S on the collapsible drum 10 when the drum 10 is at the loading position serves to center the stock S on the drum 10 as the drum 10 is rotated.

The collapsible drum 10 is also mounted on a slide 16 (Fig. 2) for axial movement towards the end of the tire building drum D. This latter movement permits the collapsible drum 10 to be positioned adjacent the tire building drum D during the application of the stock thereto and to be retracted after application so as to leave sufficient space around the end of the tire building drum D to permit removal of finished carcass from the drum D.

The structure and function of the apparatus having been broadly given, a more detailed description of the elements thereof is given hereafter.

Collapsible drum

As best shown in Figs. 5 and 6, each of the segments 11 forming the collapsible drum 10 are mounted for inward and outward movement to collapse and expand the drum 10, by means of parallel links 17 and 18 which are pivotally attached at one end to a segment 11 and at the other end to a hollow cylindrical shaft 19. Relative axial movement between the segments 11 and the shaft 19 causes inward or outward movements of the segments, depending on the direction of the relative movement. Movement of the segments 11 relative to the shaft 19 is effected by means of a pair of fluid cylinders 20 and 21 (Figs. 1 and 6). The cylinders 20 and 21 are secured at diametrically opposed points to a plate 22. The plate 22 is secured to a cylindrical housing 23, through which the shaft 19 extends and in which the shaft 19 is journaled so that the collapsible drum 10 may be rotated about its axis. The piston rod 20a of cylinder 20 and the piston rod 21a of cylinder 21 are pivotally attached to a ring 24.

Secured to and extending radially inwardly from the ring 24 are freely rotatable rollers 25 (Fig. 6) and 26 (Fig. 5). The rollers 25 and 26 extend into a continuous annular channel 27 formed in the outer surface of the ring portion 28b of a ring member 28 rotatably mounted with the shaft 19 thereby providing a rotary coupling between the piston rods 20a and 21a and the ring member 28 so that ring member 28 may rotate relative thereto. Each of the segments 11 is operatively connected to the ring member 28 by a link 29 which extends through an opening between the hub 28a and rim 28b of the ring member 28 and is pivotally connected at one end to a segment 11 and at the other end to the ring member 28. Admission of fluid under pressure to the cylinders 20 and 21 to retract the piston rods 20a and 21a thereof, therefore, moves the segments 11 in an axial direction relative to the shaft 19 thereby causing, because of the links 17 and 18, outward movement of the segments 11 to expanded position. Admission of fluid to the cylinders 20 and 21 to extend the piston rods 20a and 21a thereof causes the segments 11 to move inwardly to a collapsed position.

The extension members 12 carried by the segments 11, which carry the stock in band form and which when extended serve to position the stock over the tire buiding drum D, are slidably received, as best shown in Fig. 4, in T-slots 30 formed in the outer surface of the segments 11.

Carried in a longitudinally extending opening through the extensible members 12 and journaled at each end in the sides of the opening are the rollers 13, previously referred to which extend above the outer surface of the members 12 and serve to facilitate the axial movement of the band of stock carried thereby. Interposed between the rollers 13 are similarly mounted rollers 31 which extend below the inner face of the extension members 12 and engage the base of the T-slot 30 thereby decreasing the friction between the extension members 12 and the segments 11. The rollers 31 also serve, when the members 12 are extended in the application of stock to the tire building drum D, to prevent the extension members 12 from dragging on the surface of the tire building drum D or stock previously applied thereto.

Figure 7:
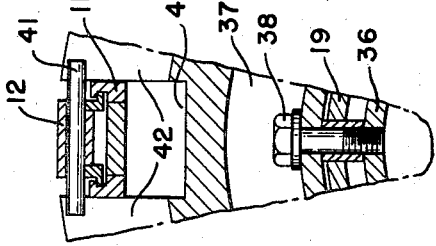
Fig. 7 is a sectional view taken on the line VII—VII of Fig. 6.

Axial movement of the extension members 12 to extend them beyond the end of the segments 11 and around the tire building drum D so that the stock in band form may be deposited onto the tire building drum D, is provided by a fluid cylinder 32 mounted in the interior of the hollow shaft 19. The end of the cylinder 32 extends from the end of the shaft 19 and is secured to bars 33, best shown in Figs. 2 and 3, which are secured to a plate 34 which in turn is secured to the housing 23. The end of the piston rod 32a of the cylinder 32 is rotatably connected by means of a bearing 35 to a cylindrical member 36 which is slidably received in the hollow shaft 19. The rotary connection between the piston rod 32a and the cylindrical member 36 permits the cylindrical member 36 to rotate about its axis relative to the piston rod 32a and the cylinder 32. The cylindrical member 36 is connected by means of bolts 38 which extend through elongated slots 39 in the shaft 19 to an annular plate member 37, which surrounds the shaft 19 and is slidable thereon. The annular member 37 is provided with spaced slots 40 which extend radially inwardly from the periphery thereof and through which the segments 11 extend as shown in Figs. 5, 6 and 7. As best shown in Fig. 7, each extension member 12 is connected to the annular member 37 by means of a pin 41 which extends therethrough and into grooves 42 formed in the sides of the slot 40. This pin and slot arrangement permits the extension members 12 to move radially inwardly and outwardly with the segments 11. Admission of pressure to the cylinder 32 to extend the piston rod 32a thereof, therefore, causes the extension members 12 to be extended axially beyond the ends of the segments 11 to position stock in band form carried thereby around the tire building drum D as shown in Fig. 6.

A motor 43, best shown in Fig. 2, is secured to a bracket 43a (Fig. 1) to drive the shaft 19 to thereby rotate the collapsible drum 10 carried thereon. The motor 43 drives the shaft 19 through a belt 44 interconnecting a pulley 45 secured to the end of the shaft 19 and a pulley 46 secured to the output shaft 47 of the motor 43.

Stock stripping fingers

The stock stripping fingers 14, which engage the stock S and prevent movement thereof with the extension members 12 as they are retracted from around the tire building drum D, are pivotally attached at spaced intervals to a radially inwardly extending flange 48 of a ring member 49. The flange 48 is slotted to receive the fingers 14. The stock engaging ends 14a of the fingers 14 are urged inwardly toward the surface of the drum 10 by an endless extension spring 50, best shown in Fig. 1, which extends around all of the fingers 14. The spring 50 fits into a transverse slot 51 formed in an integral projection 52 provided on each finger 14 intermediate the stock engaging end 14a thereof and the pivot point.

An adjustable stop in the form of a stud 53 threaded through the other end of each finger 14 and locked by a nut 54 engages the underside of the ring member 49 and serves to limit the extent of inward movement of the stock engaging ends 14a of the fingers 14.

The stud 53 is adjusted so that the engaging ends 14a of the fingers 14 do not engage the stock when the drum 10 is collapsed as shown in Fig. 5 but will engage the stock when the drum 10 is expanded and the stock carried thereby is stretched.

In applying tread stock, as illustrated in the drawings, the fingers 14 engage the hump H portion which forms the tread portion of the tire. In applying carcass stock, there being no hump portion, the fingers would engage the flat surface thereof and to this end, the stock engaging ends 14a thereof are knurled or otherwise roughened to ensure effective engagement thereof with the stock. The ring member 49 which carries the fingers 14 is secured to axially extending fluid cylinders 55 and 56, best shown in Fig. 6. The piston rods 55a and 56a of the cylinders 55 and 56 are secured to the plate 22 so that the piston rods are stationary while the cylinders are movable. The piston rods 55a and 56a are hollow and provide two concentric passageways 55b, 55c and 56b, 56c respectively through which fluid under pressure may be admitted or exhausted. The cylinders 55 and 56 serve to retract the fingers 14 from the position shown in Fig. 6 to the position shown in Fig. 5 after application of the stock S to the tire building drum D.

As shown by comparison of Figs. 5 and 6, the fingers 14 and the ring member 49 to which they are secured are moved with the extension members 12 as the extension members 12 are extended over and around the tire building drum D, as shown in Fig. 6, by the admission of fluid under pressure to the cylinder 32 by engagement of studs 57 threaded through the ring member 37 with the inner portion of the flange 48 of the ring member 49. Thus, the fingers 14 are moved toward the tire building drum D by the cylinder 32 rather than by the cylinders 55 and 56. The relative axial position between the fingers 14 and the extension members 12 may be varied by adjusting the studs 57. There being a definite positional relationship between the fingers 14 and the extension members 12 as well as between the extension members 12 and the tire building drum D, the stock will be properly positioned on the tire building drum as the extension members 12 are retracted.

Simultaneously with the retraction of the extension members 12, pressure is admitted to the cylinders 55 and 56 through passageways 55c and 56c to thereby hold the fingers 14 stationary so that the stock S engaged thereby will be slid axially off the ends of the extension members 12 onto the tire building drum D. After the stock S has been removed from the extension members 12, the fingers 14 are retracted to the position shown in Fig. 6 by the application of pressure to the cylinders 55 and 56 through passageways 55b and 56b.

Secured to and surrounding the piston rods 55a and 56a are guide blocks 58 and 59. The blocks 58 and 59 have axially extending grooves 58a and 59a, respectively, formed in their inner faces. Freely rotatable rollers 60 and 61 extend into the grooves 58a and 59a. The rollers 60 and 61 are secured to the ring 24, previously referred to in the description of the collapsible drum 10. The rollers provide additional restraint against rotation of the ring 24, while permitting the ring 24 to be moved axially by the cylinders 20 and 21 in the collapsing and expanding of the segments 11 of the drum 10.

*Mounting structure for collapsible drum*

As previously described, the shaft 19, to which the segments 11 of the drum 10 are attached, is rotatably supported in a cylindrical housing 23. Referring to Figs. 3 and 8, the housing 23 in turn is secured at one end to vertically extending plate 22 and at the other end to plates 34. Plates 22 and 34 are secured to a horizontal base plate 62 and plate 62 is secured to vertical plates 63. Plates 63 in turn are secured to a sleeve 64 which is secured to a vertically extending shaft 65. Shaft 65 is journaled in a vertical cylinder 65a which in turn is secured to the slide 16.

This arrangement permits the collapsible drum 10 to be pivoted horizontally with respect to the slide 16 from a discharge position in alignment with the end of the tire building drum D to a loading position as shown in dashed lines in Fig. 1.

As best shown in Figs. 3 and 8, the collapsible drum 10 is adapted to be pivoted by means of a fluid cylinder 66. The end of the cylinder 66 is pivotally attached to the slide 16 and the piston rod 66a thereof is pivotally attached to one of the vertically extending supporting plates 63 at a point eccentric to the axis of the shaft 65. Admission of fluid to the cylinder 66 to extend the piston rod thereof, as shown in dashed lines in Fig. 8, therefor, serves to pivot the collapsible drum to the loading position as shown in dashed lines in Fig. 1, and admission of fluid to retract the piston rod thereof serves to pivot the collapsible drum 10 to discharge position in alignment with the end of the tire building drum D.

The slide 16 is slidably mounted for movement towards and away from the end of the tire building drum D on horizontal ways 67 provided on a base 68 (Fig. 2). Movement of the slide 16 is provided by rotation of an elongated screw 69 (Figs. 3 and 8) which threads through an elongated nut 16a secured to the slide 16 and is journaled at its ends in bearings 70 and 71 secured to opposite ends of the base 68. As best shown in Figs. 2 and 8, the screw 69 is adapted to be rotated by a motor 72 secured to the side of the base 68, through a belt 73 interconnecting a pulley 74 secured to the end of the screw 69 and a pulley 75 secured to the shaft of the motor 72.

A stop in the form of a bolt 76 threaded into the end of an arm 77 secured to the slide 16 and locked by a nut 78 serves to limit the extent of axial movement of the slide toward the end of the tire building drum D. The head of the bolt 76 engages the head of a bolt 79 threaded into the end of the base 68. The extent of movement of the slide 16 can, therefore, be adjusted by adjustment of either bolt 76 or bolt 79.

*Tread stock centering mechanism*

The tread stock centering mechanism 15 is secured to a bracket 80 which in turn is secured to and extends out from the slide 16.

The centering mechanism includes two meshing gear segments 81 and 82, best shown in Fig. 1, mounted for horizontal rotation on the bracket 80. The segments 81 and 82 have integral, radially extending arms 83 and 84 respectively. Freely rotatable rollers 85 and 86 are secured to the ends of the arms 83 and 84.

Simultaneous rotation of the gear segments 81 and 82 to move the rollers 85 and 86 carried thereby toward or away from each other is provided by a fluid actuated cylinder 87. The cylinder 87 is pivotally attached to a plate 88 which is secured to the bracket 80. The piston rod 87a of the cylinder 87 is pivotally attached to the segment 81 eccentrically to the center of rotation thereof so that extension or retraction of the piston rod 87a will cause simultaneous rotation of the gear segments 81 and 82.

In centering tread stock on the drum 10, fluid under pressure is admitted to the cylinder 87 to extend the piston rod 87a thereof to thereby cause rotation of the gear segments 81 and 82 to move the rollers 86 and 87 toward each other. Simultaneously therewith the collapsible drum 10 is rotated to rotate the stock carried thereby. As the rollers 86 and 87 are moved toward each other they engage the shoulders of the hump portion of the tread stock as the stock is rotated to thereby properly center the stock on the collapsible drum 10.

*Cycle of operation*

On initial operation, the extension members 12, the stripping fingers 14, and the slide 16 are in retracted position. The collapsible drum 10 is collapsed and positioned in loading position as shown in dashed lines in Fig. 1.

The tread stock, previously fabricated in endless band shape to a diameter less than that of the tire building drum D, is slipped over the end of the collapsed drum 10 onto the extension members 12. Placement of the stock on the collapsible drum 10 is facilitated by the rollers 13 of the extension members 12.

Fluid under pressure is next admitted to cylinder 20 causing the drum to expand only a sufficient amount to hold the stock thereon. The drum is then rotated by operation of motor 43 (Fig. 2) and the centering device 15 actuated by admission of fluid under pressure to the cylinder 87 to extend the piston rod thereof to thereby move the rollers 85 and 86 toward each other to the center of the tread stock on the collapsible drum 10 as the stock is rotated. The rollers 13 facilitate axial movement of the stock in the centering thereof.

After centering of the stock, rotation of the collapsible drum 10 is stopped and the collapsible drum 10 indexed to discharge position in alignment with the end of the tire building drum D by admission of fluid to cylinder 65 (Figs. 3 and 8) to retract the piston rod thereof.

The slide 16 is next moved by operation of the motor 72 to rotate screw 69 (Figs. 3 and 8), toward the end of the tire building drum D to position the collapsible drum 10 carried thereby adjacent to the end of the tire building drum D.

The drum is next completely expanded by admission of fluid under pressure to both cylinders 20 and 21 (Fig. 6) to expand the stock carried thereby, and the extension members 12 extended, by admission of fluid under pressure to the cylinder 32 beyond the ends of the segments 11 of the drum 10 to position the stock around the tire building drum D, as shown in Fig. 6. As the extension members 12 are extended beyond the end of the segments 11 of the drum 10, the fingers 14 are moved therewith by engagement of the stud 57 with the flange 48 of the ring member 49 to which the fingers 14 are attached.

After the extension members 12 have been completely extended to position the stock carried thereby over the tire building drum D, they are retracted by admission of fluid to the cylinder 32 to retract the piston rod 32a thereof and simultaneously therewith fluid under pressure is admitted to the cylinders 55 and 56 to hold the fingers stationary. As the extension members 12 are retracted, the stock is engaged by the ends 14a of the fingers 14, as best shown in Fig. 6, and the stock is stripped off the extension members 12 and contracts tightly around the drum D, or previously applied carcass fabric, due to the stretched condition thereof and its inherent elasticity. As the application of the stock is progressive from one end of the tire building drum to the other, air is expelled from between the stock and the drum as the stock is applied.

After the stock has been applied to the tire building drum D, the fingers 14 are retracted by the admission of fluid under pressure to the cylinders 55 and 56 to retract the cylinders.

The collapsible drum 10 is next collapsed by admission of fluid to the cylinders 20 and 21 (Fig. 5) to extend the piston rods 20a and 21a thereof and the collapsible drum 10 indexed to loading position, as shown in dashed lines in Fig. 1, preparatory to initiating another cycle of operation.

Each of the motors and fluid cylinders may be provided with separate manually operable switches or valves for manual control or, if desired, an automatic control system including limit switches and valves may be provided to actuate the various motors and fluid cylinders automatically in timed sequence.

From the above description it can be seen that there is provided apparatus which will quickly and efficiently apply stock in endless band form to a tire building drum.

While the preferred form of the invention has been shown and described, it is to be understood that this is for the purpose of illustration only and that modifications and changes can be made therein without departing from the spirit and the scope of the invention.

Having thus described our invention, what we claim and desire to protect by Letters Patent is:

1. Apparatus for applying tire stock in endless band form to a tire building drum in the fabrication of a tire comprising, a collapsible drum extendible when expanded over and around a tire building drum to position stock carried thereby over and around the tire building drum, stripping means for stripping the stock off of the outer surface of said collapsible drum on to the tire building drum as the collapsible drum is retracted axially from around the tire building drum, means mounting said collapsible drum for movement from a discharge position in alignment with the end of a tire building drum to a loading position and means mounting said collapsible drum for rotation about its axis and for axial movement.

2. Apparatus for applying tire stock in endless band form to a tire building drum in the fabrication of a tire comprising, a collapsible drum extendible when expanded over and around a tire building drum to position stock in band form carried thereby over and around the tire building drum, stripping means for stripping stock off the outer surface of said collapsible drum on to the tire building drum as the collapsible drum is retracted axially from around the tire building drum, and means mounting said collapsible drum for movement from a discharge position in alignment with the end of a tire building drum to a loading position, and means at the loading position for centering stock placed on said collapsible drum.

3. The apparatus as set forth in claim 2 wherein said centering means includes a pair of rollers engageable with the stock on the collapsible drum and movable toward each other to center the stock on the collapsible drum.

4. Apparatus for applying tire stock in endless band form to a tire building drum in the fabrication of a tire comprising, a collapsible drum having an extension portion collapsible and expandable with the drum, said extension portion forming a hollow generally cylindrical extension of the drum adapted to be extended axially over and around a tire building drum to position stock carried thereby around the tire building drum, and means engageable with stock carried by said extension portion for stripping the stock off of the outer surface of said extension portion upon retraction of said extension portion from around the tire building drum.

5. Apparatus for applying tire stock in endless band form to a tire building drum comprising, a collapsible drum having an extension portion which is collapsible and expandable with the collapsible drum, the extension portion forming a hollow generally cylindrical extension of the drum adapted to be extended axially over and around a tire building drum to position stock carried thereby around the tire building drum, means engageable with stock carried by the outer surface of said extension portion for stripping the stock off of said extension portion on to the tire building drum upon retraction of the extension portion from around the tire building drum, and anti-friction means carried by and extending from the outer surface of the extension portion to facilitate axial movement of the stock on the extension portion.

6. Apparatus for applying tire stock in endless band form to a tire building drum comprising, a collapsible drum formed of a plurality of segments mounted for inward and outward movement, means for moving said segments inwardly and outwardly to collapse and expand the drum, each of said segments having an extension member, said extension members collectively forming a hollow generally cylindrical extension of the collapsible drum adapted to be extended axially over and around the tire building drum to position stock carried thereby around the tire building drum, means engageable with the stock carried on the outer surface of said extension members and means for effecting relative axial movement between said stock engageable means and said extension members whereby the stock will be stripped from the outer surface of said extension members on to the tire building drum.

7. Apparatus for applying tire stock in endless band form to a tire building drum comprising, a collapsible drum formed of a plurality of segments mounted for inward and outward movement, means for moving said segments inwardly and outwardly to collapse and expand the drum, each of said segments having an extension member extendible axially beyond the end of the segment, means for extending said extension members, said extension members collectively forming when extended a hollow generally cylindrical extension of the collapsible drum adapted to be extended over and around a tire building drum to position stock carried thereby around the tire building drum, means engageable with the stock carried on the outer surface of said extension members and means for effecting relative axial movement between said stock engageable means and said extension members whereby the stock will be stripped from the outer surface of said extension members on to the tire building drum.

8. Apparatus for applying tire stock in endless band form to a tire building drum in the fabrication of a tire comprising, a collapsible drum formed of a plurality of segments mounted for inward and outward movement, means for moving said segments inwardly and outwardly to collapse and expand the drum, each of said segments having an axially extending groove formed in the outer face thereof and an extension member slidably mounted in the groove for extension axially beyond the end of the segment, each extension member having rollers extending beyond the inner and outer faces thereof and the extension members collectively forming a hollow generally cylindrical extension of the drum adapted to be extended axially over and around a tire building drum to position stock carried thereby around the tire building drum, means engageable with the stock carried on the outer surface of said extension members and means for effecting relative axial movement between said stock engageable means and said extension members whereby the stock will be stripped from the outer surface of said extension members onto the tire building drum.

9. A collapsible drum formed of a plurality of segments mounted for inward and outward movement, means for moving said segments inwardly and outwardly to collapse and expand the drum, each of said segments having an extension member, said extension members collectively forming a hollow generally cylindrical extension of the collapsible drum adapted to be extended axially over and around a tire building drum to position stock carried thereby around the tire building drum, a ring member surrounding said extension members, a plurality of circumferentially spaced fingers engageable with the stock carried by said extension members secured to said ring member, and means for effecting relative axial movement between said ring member and said extension members whereby the stock will be stripped off of said extension members on to the tire building drum.

10. Apparatus for applying tire stock in endless band form to a tire building drum in the fabrication of a tire comprising, a base, a slide mounted on said base, means for effecting linear movement of said slide, a collapsible drum rotatably mounted on said slide and movable in an axial direction with said slide, said collapsible drum being formed of a plurality of segments mounted for inward and outward movement, means for moving said segments inwardly and outwardly to collapse and expand the drum, each of said segments having an extension member extendible axially beyond the end of the segment, means for extending said extension members, said extension members collectively forming a hollow generally cylindrical extension of the collapsible drum adapted to be extended over and around a tire building drum, means surrounding said extension members and engageable with stock carried on said extension members, and means for effecting relative movement between said stock engageable means and said extension members whereby stock carried by said extension members will be stripped off of said extension members on to said tire building drum.

References Cited in the file of this patent

UNITED STATES PATENTS

| | | |
|---|---|---|
| 2,517,889 | Kuffler | Aug. 8, 1950 |
| 2,521,143 | Benson | Sept. 5, 1950 |
| 2,822,025 | Hollis | Feb. 4, 1958 |
| 2,822,027 | Hollis | Feb. 4, 1958 |